United States Patent [19]
Yanagi

[11] Patent Number: 5,724,328
[45] Date of Patent: Mar. 3, 1998

[54] DISK DRIVE APPARATUS HAVING IMPROVED INITIALIZATION PROCESS

[75] Inventor: Shigenori Yanagi, Kawasaki, Japan

[73] Assignee: Fujitsu Limited, Kawasaki, Japan

[21] Appl. No.: 467,692

[22] Filed: Jun. 6, 1995

Related U.S. Application Data

[62] Division of Ser. No. 348,182, Nov. 28, 1994, which is a continuation of Ser. No. 115,988, Sep. 18, 1993, abandoned, which is a continuation of Ser. No. 584,350, Sep. 18, 1990, abandoned.

[30] Foreign Application Priority Data

Sep. 18, 1989 [JP] Japan ................................. 1-241294

[51] Int. Cl.$^6$ ........................................................ G11B 7/00
[52] U.S. Cl. ................... 369/50; 369/54; 369/58; 369/47
[58] Field of Search ....................... 369/50, 54, 53, 369/58, 47, 49, 44.27, 44.28, 44.32, 44.25

[56] References Cited

U.S. PATENT DOCUMENTS

| | | |
|---|---|---|
| 4,656,617 | 4/1987 | Nakatsuyama et al. . |
| 4,721,850 | 1/1988 | Sakai et al. . |
| 4,856,011 | 8/1989 | Shimada et al. . |
| 4,998,233 | 3/1991 | DiMatteo et al. . |
| 5,020,045 | 5/1991 | Smart et al. . |
| 5,042,020 | 8/1991 | Endo . |
| 5,187,696 | 2/1993 | Ishii et al. .................... 369/58 X |

FOREIGN PATENT DOCUMENTS

| | | |
|---|---|---|
| 164061 | 12/1985 | European Pat. Off. . |
| 164863 | 12/1985 | European Pat. Off. . |
| 289304 | 11/1988 | European Pat. Off. . |

OTHER PUBLICATIONS

Patent Abstracts of Japan, vol. 8, No. 282 (P-323) (1719) 22 Dec. 1984 for JP-A-59-148183 (Hitachi) of 24 Aug. 1984.
*Interim Version of DIS 10089*, ISO/IEC JTC1 Information Technology, SC23/WG1, JTC1/SC23 N 321, Jul. 1990, pp. 37–42.

Primary Examiner—Muhammad N. Edun
Attorney, Agent, or Firm—Staas & Halsey

[57] ABSTRACT

A disk drive apparatus includes a driving circuit which rotates a recording media having a disk shape, and a read/write head movable in a radial direction of the recording media and a vertical direction substantially perpendicular to a plane of the radial direction. The read/write head writes data on the recording media and reads data therefrom. The disk drive apparatus also includes an initialization unit which initializes the read/write head during a period until the recording media starts to rotate and the rotating speed of the recording media reaches a predetermined constant speed so that the disk drive apparatus is set to a read/write enable state where the read/write head is correctly positioned with respect to the recording media in order to correctly write data on the recording media and read data therefrom.

30 Claims, 10 Drawing Sheets

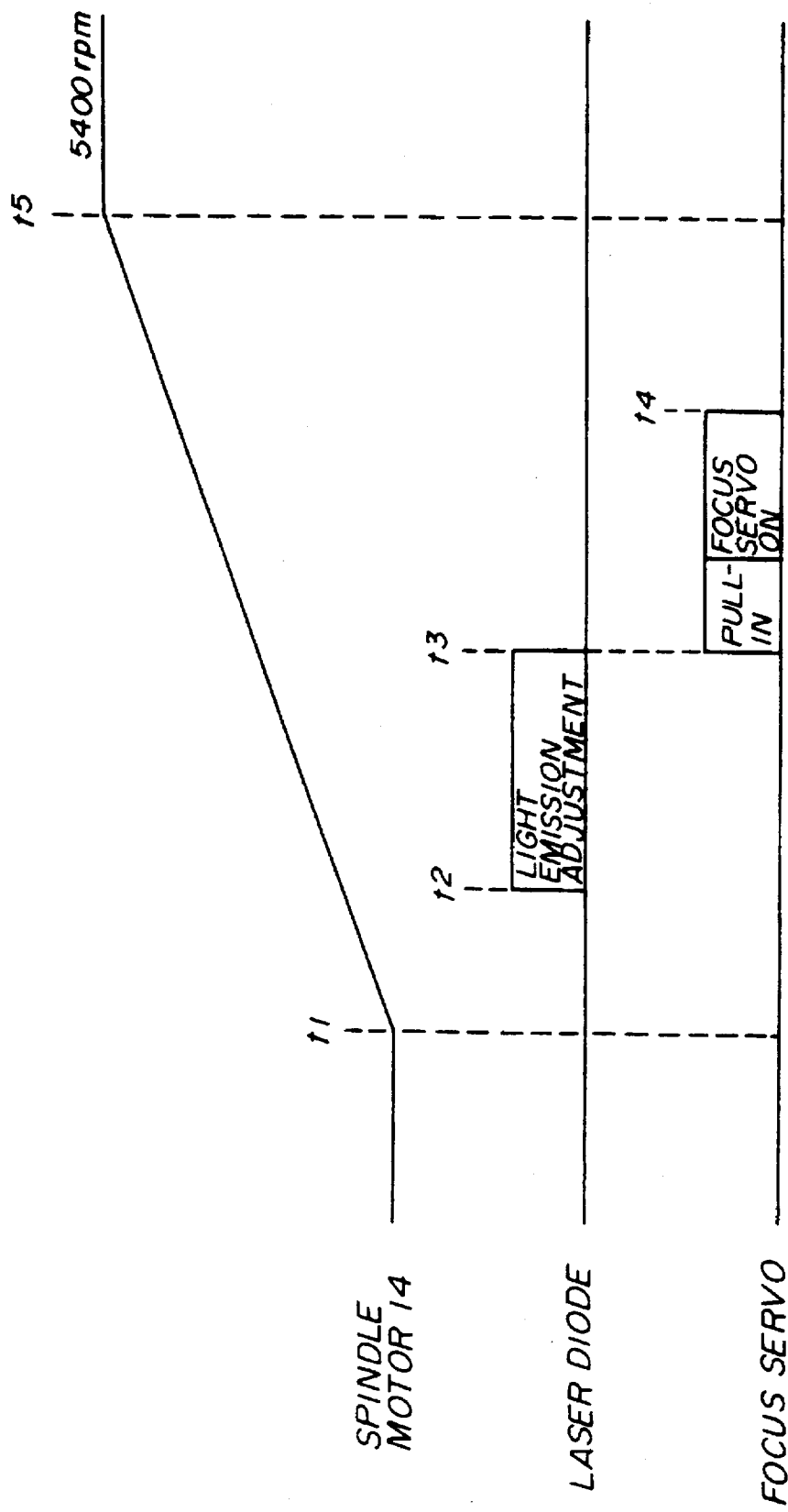

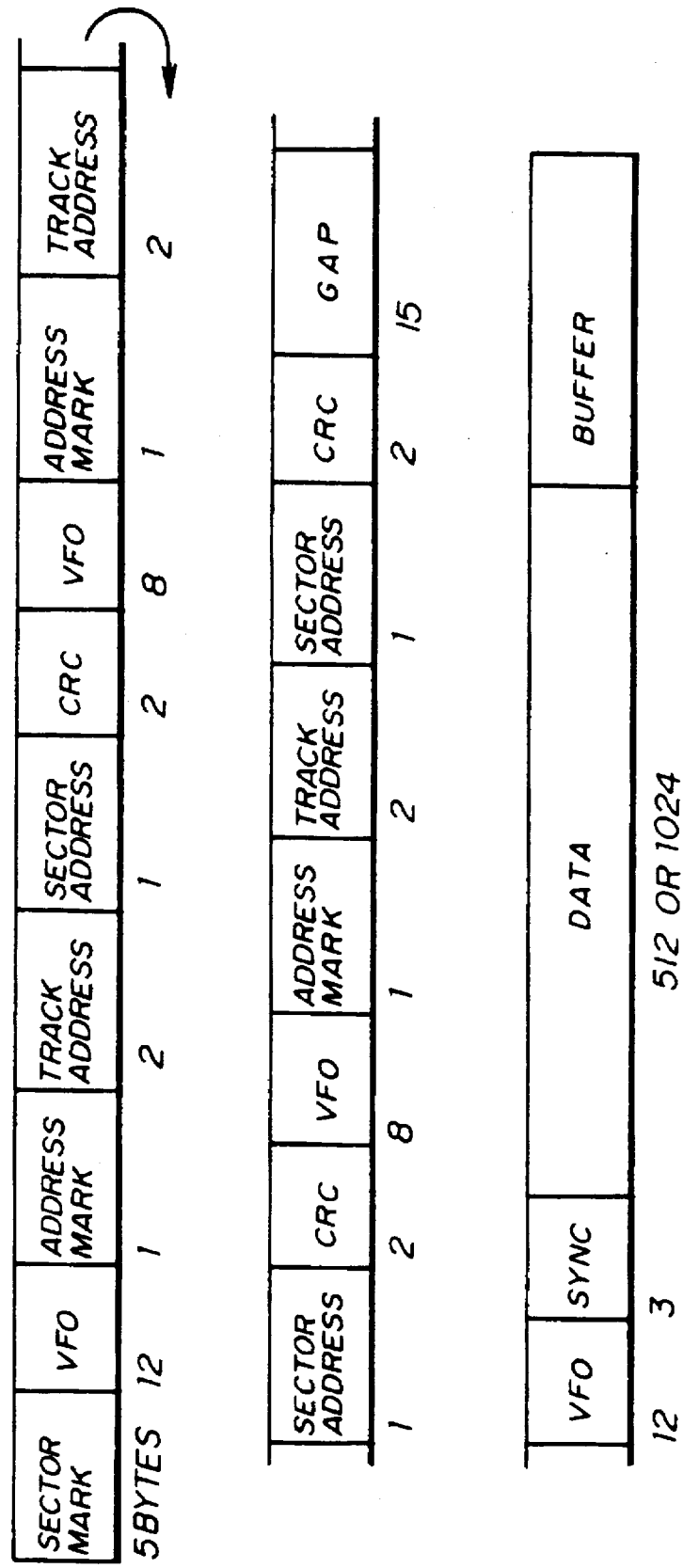

DISK DRIVE APPARATUS HAVING IMPROVED INITIALIZATION PROCESS

This application is a division of application Ser. No. 08/348,182, filed Nov. 28, 1994, pending, which is a continuation of application Ser. No. 08/115,988, filed Sep. 3, 1993, abandoned, which is a continuation of application Ser. No. 07/584,350, filed Sep. 18, 1990, abandoned.

BACKGROUND OF THE INVENTION

The present invention generally relates to a disk drive apparatus, and, more particularly, to an improvement of an initialization process by which a disk drive apparatus is set to a read/write enable state. More specifically, the present invention relates to a disk drive apparatus having a replaceable disk.

Various types of disk drive apparatuses are known. An optical disk drive apparatus or a magneto-optical disk drive apparatus has an extremely large storage capacity and is thus expected to be used as a large-capacity storage unit of a computer system. There is known an optical or magneto-optical disk drive apparatus which has a replaceable optical disk. An optical or magneto-optical disk is inserted into the disk drive apparatus through a disk loading mechanism where a spindle motor is in a stationary state. When the loading of the disk is completed, a loading complete detection signal is generated and output to the spindle motor. The rotating speed of the spindle motor starts to increase toward a constant speed equal to, for example, 3600 rpm. After the spindle motor reaches the constant speed, an initialization (adjustment) process is carried out.

As shown in FIG. 1, an initialization process including a first focusing adjustment, a phase encoded part ("PEP") read adjustment, a laser diode (LD) light emission adjustment and a second focusing adjustment is carried out after the rotating speed of the spindle motor reaches the constant speed. During both the first and second focusing adjustments, an object lens is moved within a predetermined range and a focus servo control is pulled in. During the focusing adjustment, a laser diode is adjusted so that a predetermined read power and write power are obtained. The PEP read adjustment determines whether or not PEP data recorded in a PEP zone as defined by the ISO/IEC DIS 10089 are correctly read out. After completing the above-mentioned adjustment processes, the disc drive apparatus is set to a read/write enable state (ready-ON state) where data is read out from or written on the disk.

However, conventional disk drive apparatuses as described above have the following disadvantage. As described above, the initialization process is carried out after the spindle motor starts to rotate at the constant speed, and the disk drive apparatus is set to the read/write state after the initialization process is completed. Thus, it takes a long time to obtain the read/write enable state. In the case where the rotating speed of the spindle motor is increased up to 1800 rpm, it takes about five seconds to obtain the read/write enable state.

SUMMARY OF THE INVENTION

It is a general object of the present invention to provide an improved disk drive apparatus in which the above-mentioned disadvantage is eliminated.

A more specific object of the present invention is to provide a disk drive apparatus having a reduced amount of time to obtain the read/write enable state after the spindle motor starts to rotate.

The above-mentioned objects of the present invention are achieved by a disk drive apparatus comprising: driving means for rotating a recording media having a disk shape; read/write head means, movable in a radial direction of the recording media and a vertical direction perpendicular to the radial direction, for writing data on the recording media and for reading data therefrom; and initialization means, coupled to the driving means and the read/write head means, for initializing the read/write head means during a period until the recording media starts to rotate and the rotating speed of the recording media reaches a predetermined constant speed so that the disk drive apparatus is set to a read/write enable state where the read/write head means is correctly positioned with respect to the recording media in order to correctly write data on the recording media and read data therefrom.

BRIEF DESCRIPTION OF THE DRAWINGS

Other objects, features and advantages of the present invention will become apparent from the following detailed description when read in conjunction with the accompanying drawings, in which:

FIG. 5 is a graph illustrating the operation of the disk drive apparatus according to the first embodiment of the present invention;

FIG. 10 is a diagram illustrating the format of a sector in a user zone on the optical disk shown in FIG. 8.

DESCRIPTION OF THE PREFERRED EMBODIMENTS

A description will now be given of the principle of a disk drive apparatus according to the present invention with reference to FIG. 2.

Figure 1:
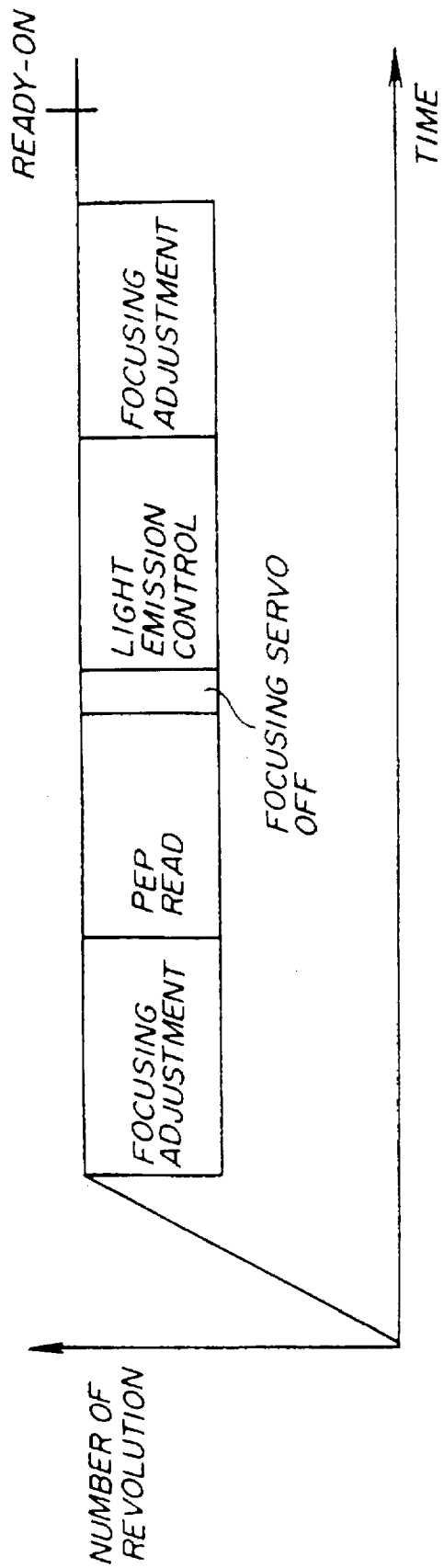
FIG. 1 is a graph illustrating a conventional initialization process.
Figure 2:
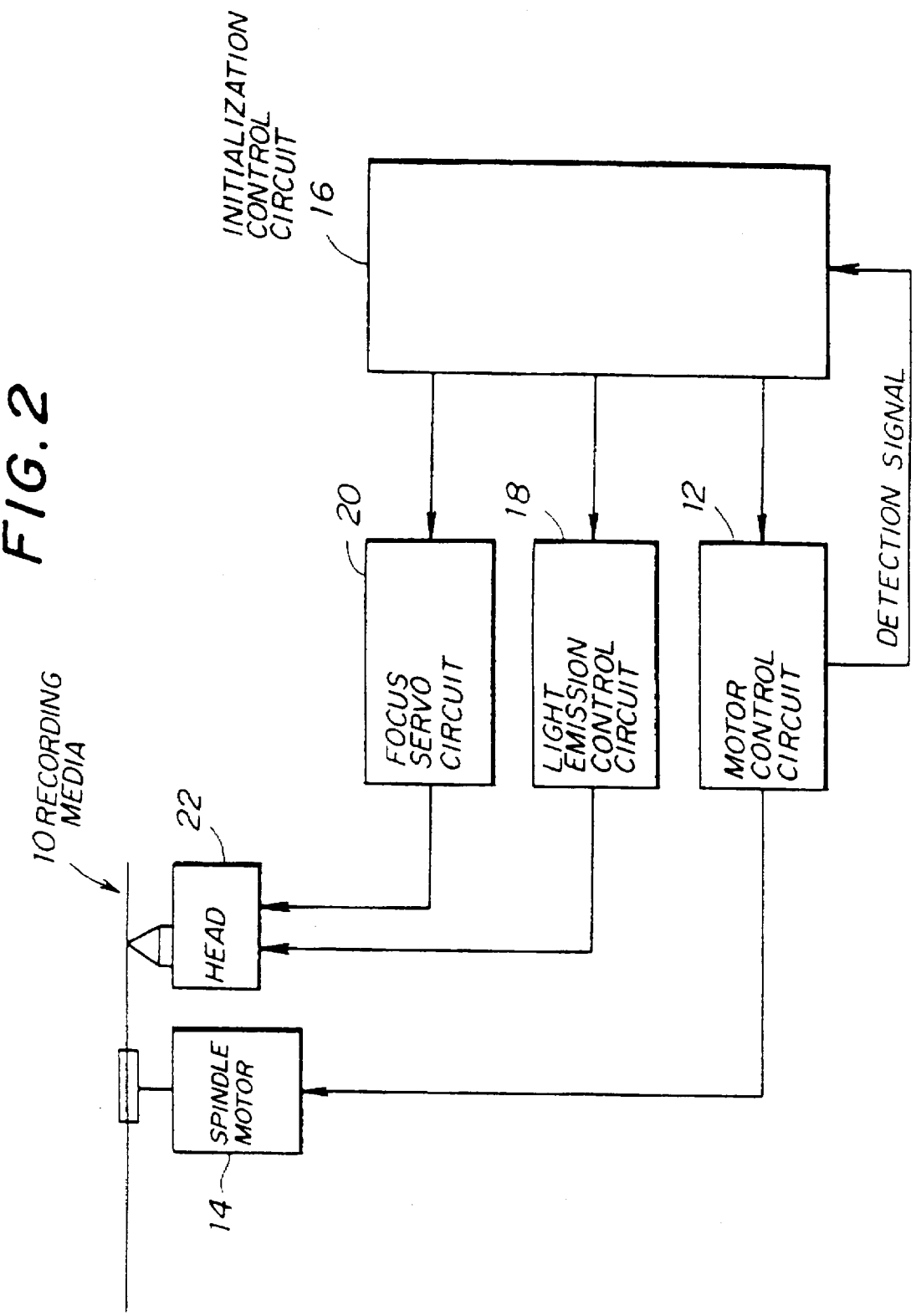
FIG. 2 is a block diagram of a disk drive apparatus according to the present invention.

Referring to FIG. 2, the disk drive apparatus has a recording media such as an optical disk or a magneto-optical disk, a motor control circuit 12, a spindle motor 14, an initialization control circuit 16, a light emission control circuit 18, a focus servo circuit 20 and a head 22. Under the control of the initialization control circuit 16, the motor control circuit 12 starts to rotate the spindle motor 14 when the disk 10 is loaded into the disk drive apparatus. The rotating speed of the spindle motor 14 increases and is monitored by the motor control circuit 12. Before the spindle motor 14 starts to rotate at a predetermined constant speed, the initialization control circuit 16 controls the light emission control circuit 18 and the focus servo circuit 20. The light emission control circuit 18 starts a light emission adjustment in which a laser diode built in the head 22 is adjusted to obtain a predetermined read power and write power. The focus servo circuit 20 starts a focusing adjustment in which an object lens built in the head 22 is moved so as to obtain a focus position. It will be noted that the light emission adjustment and the focusing adjustment are carried out and completed before the rotating speed of the spindle motor 14 has become equal to the predetermined constant speed. When the motor control circuit 12 detects a state where the rotating speed of the spindle motor 14 has become equal to the predetermined constant speed, it outputs a detection signal to the initialization control circuit 16. In response to the detection signal, the initialization control circuit 16 sets the disk drive apparatus to the read/write enable state (ready-ON state). Since the initialization process is carried out and completed before the rotating speed of the spindle motor 14 becomes equal to the predetermined constant speed, the amount of time it takes to obtain the read/write enable state is reduced.

Figure 3:
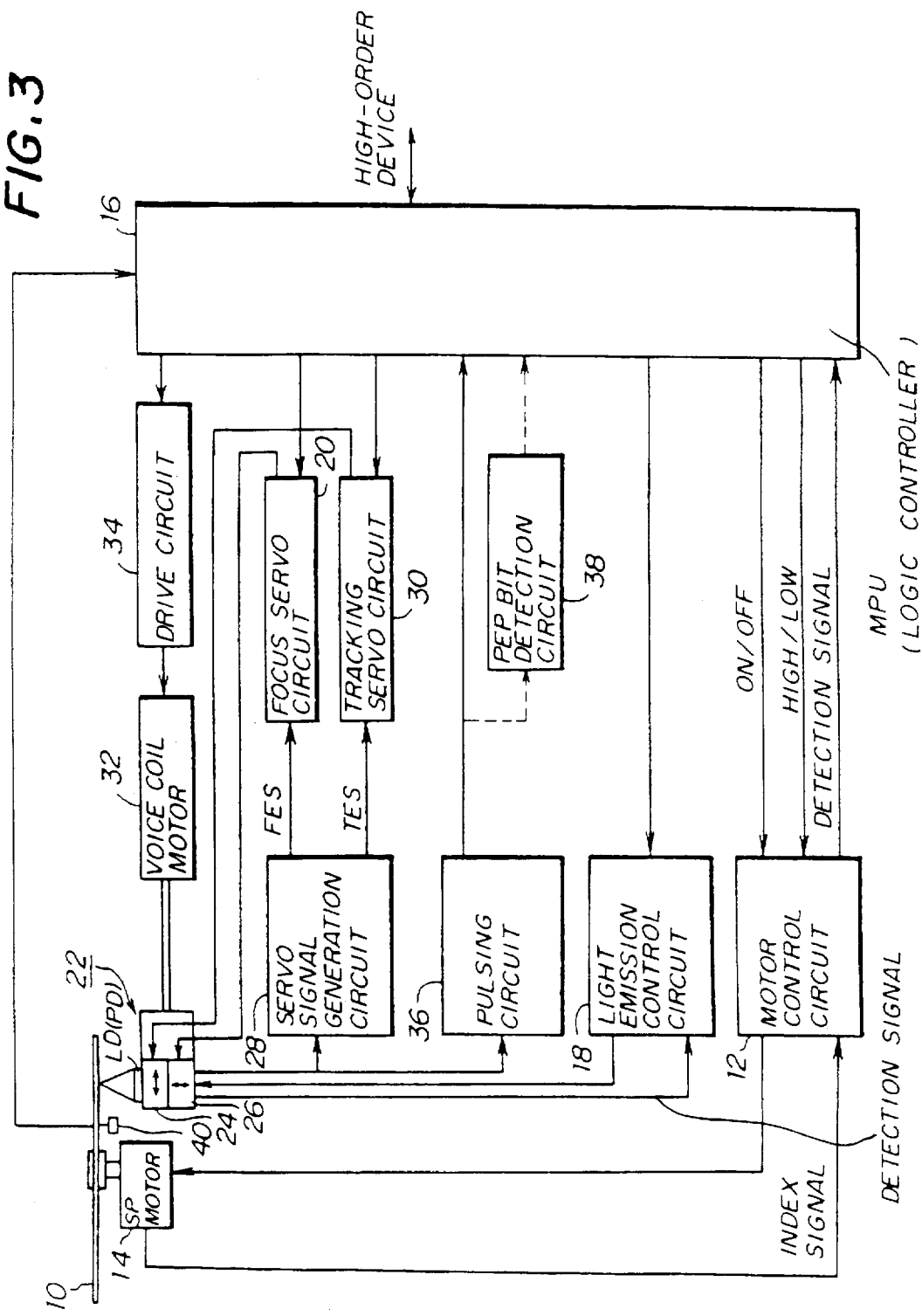
FIG. 3 is a detailed block diagram of the structure of the disk drive apparatus shown in FIG. 2.

A more detailed description will now be given of the disk drive apparatus with reference to FIG. 3. Referring to FIG. 3, the recording media 10 is formed of, for example, a 5-inch optical disk accommodated in a cassette which conforms to the ISO standard. When the optical disk 10 is inserted into the disk drive apparatus, a disk loading mechanism (not shown for the sake of simplicity) fixes the optical disk 10 to a rotating shaft of the spindle motor 14.

The spindle motor 14 is controlled by the motor control circuit 12. The spindle motor 14 is held stationary when the optical disk 10 is being loaded into the disk drive apparatus. When the loading of the optical disk 10 is completed, the disk loading mechanism outputs a loading complete detection signal to the initialization control circuit 16, which is implemented by a micro processor unit (logic controller) MPU. The MPU 16 outputs a motor ON signal to the motor control circuit 12, which activates the spindle motor 14. The spindle motor 14 is formed of, for example, a brushless DC motor. The motor control circuit 12 starts to rotate the spindle motor 14 and has the same rotation at a predetermined constant speed equal to, for example, 5400 rpm. More specifically, the motor control circuit 12 compares a reference clock signal which defines a rotating period corresponding to 5400 rpm with an index signal which shows the real rotating speed of the spindle motor 14, and executes a pulse width modulation (PWM) control in which a motor driving current is adjusted so that the phase difference between the reference clock signal and the index signal becomes zero.

The head 22 is formed of an optical head, which is mounted on a carriage and which includes a laser diode LD, a light-receiving element (photodiode) PD and an object lens (not shown for the sake of simplicity). The optical head 22 is driven in the radial direction of the optical disk 10 by a voice coil motor 32. Further, the optical head 22 includes a tracking actuator 24 and a focusing actuator 26. The tracking actuator 24 horizontally moves a light beam emitted from the laser diode within a predetermined range corresponding to a predetermined number of tracks in the radial direction of the optical disk 10. The focusing actuator 26 executes a focusing control in which the object lens (not shown) is moved in the axial direction of the spindle motor 14 so that a laser beam spot having a predetermined diameter is formed on a surface of the optical disk 10.

The voice coil motor 32 is driven by a drive circuit 34, which is supplied with a control signal generated and output by the MPU 16.

A read signal output from the optical head 22 is sent to a servo signal generation circuit 28, which derives a focusing error signal FES and a tracking error signal TES therefrom. The focusing error signal FES is sent to a focus servo circuit 20, which controls the focusing actuator 26 so that the focusing error signal FES is minimized. The tracking error signal TES is sent to the tracking servo circuit 30, which controls the tracking actuator 24 so that the tracking error signal TES is minimized. The focus servo circuit 20 and the tracking servo circuit 30 are enabled or disabled, that is, turned ON or OFF under the control of the MPU 16.

As has been previously mentioned, the optical head 22 has the laser diode LD. The laser diode LD emits different levels of power respectively during data write, read and erase procedures under the control of the light emission control circuit 18. The amount of the emitted light is detected by the photodiode PD provided in the optical head 22. A detection signal output by the photodiode PD is fed back to the light emission control circuit 18, which controls a driving current applied to the laser diode so that the difference between the detection signal and a target light emission amount defined respectively for the data write, read and erase operations is minimized.

Further, the read signal output from the optical head 22 is input to a pulsing circuit 36, which converts the read signal in analog form into a read pulse signal in digital form. The read pulse signal generated and output by the pulsing circuit 36 is input to the MPU 16, which demodulates read data from the read pulse signal.

It will be noted that a PEP bit detection circuit 38 and an inner sensor 40 are structural elements of a disk drive apparatus according to a second preferred embodiment of the present invention, which will be described in detail later.

Figure 4:
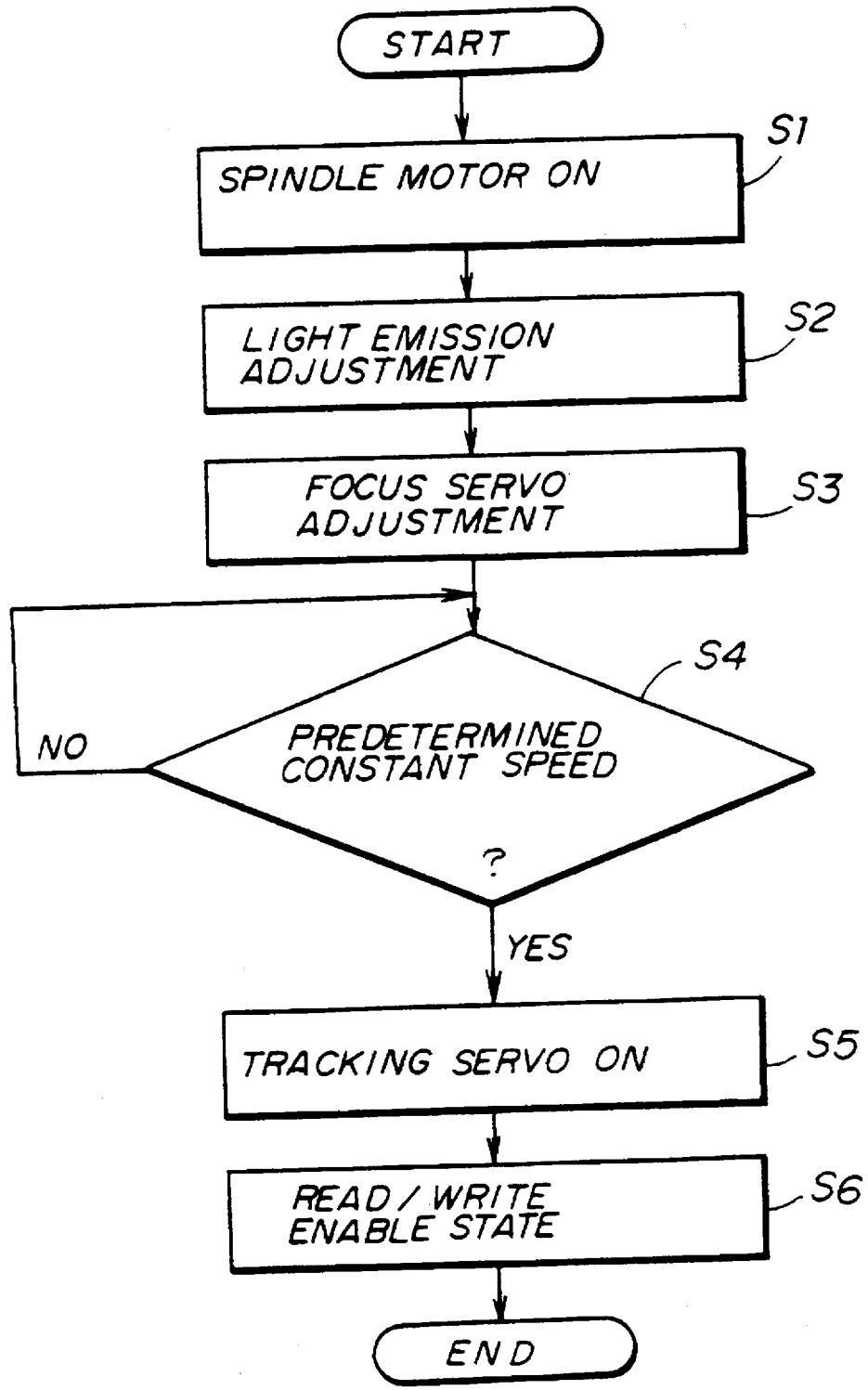
FIG. 4 is a flowchart illustrating the operation of the disk drive apparatus according to a first embodiment of the present invention.

A description with reference to FIGS. 4 and 5 will now be given of the operation of the disk drive apparatus according to a first preferred embodiment without the PEP bit detection circuit 38 and the inner sensor 40. It is now assumed that the optical disk 10 is removed from the disk drive apparatus and a new optical disk is loaded therein. The new optical disk 10 is fixed to the spindle shaft of the motor 14 by the loading mechanism (not shown for the sake of convenience). In response to the loading complete signal, the MPU 16 outputs the motor ON signal to the motor control circuit 12 (step S1 shown in FIG. 4). The motor control circuit 12 compares the phase of the reference clock signal corresponding to, for example, 5400 rpm with the index signal showing the real rotating speed. Initially, the index signal greatly lags behind the reference clock signal. Thus, the motor drive circuit 12 supplies the spindle motor 14 with a maximum current and, as shown in FIG. 5, the spindle motor 14 starts to rotate at time $t_1$.

After turning ON the spindle motor 14, the MPU 16 executes step S2, at which step the light emission adjustment is executed. The MPU 16 has information about reference light emission amounts which are provided respectively for the data write, read and erase operations and predetermined in accordance with the type of the optical disk 10. The light emission control circuit 18 receives light emission data sent from the MPU 16 for every access, and drives the laser diode by applying a driving current thereto in accordance with the received light emission data. The amount of light emitted by the laser diode respectively for the write, read and erase operations is based on the deviation between the light emission detection signal and the corresponding reference light-emitting amount. Thereby, it is possible to determine the appropriate driving currents provided respectively for the data write, read and erase operations in order to obtain the respective reference light emission amounts. As a result, it becomes possible to cancel errors in the properties of laser diodes themselves and other errors caused by the setting of laser diodes. The appropriate driving currents thus obtained are written into the light emission control circuit 18 and used when data is actually recorded on, read out from and erased from the optical disk 10. The above-mentioned light emission adjustment is carried old for a period between times $t_2$ and $t_3$ shown in FIG. 5.

The MPU 16 executes step S3, at which step the focus servo adjustment is carried out. During the focus servo adjustment, the MPU 16 activates the focus servo circuit 20, which drives the focusing actuator 26 to move the object lens within a predetermined focus search range equal to, for example, 1 mm and to seek a focus position where the focusing error signal FES generated and output by the servo signal generation circuit 28 during movement is minimized (see "PULL-IN" in FIG. 5). When such a focus position is detected, the movement of the object lens is stopped and servo control by the focus servo control circuit 20 has been pulled in and thus the "FOCUS SERVO ON" condition is established. The focus servo adjustment of step S3 in FIG. 4 is carried out during a period between time $t_3$ and time $t_4$ shown in FIG. 5.

After completing the focus servo adjustment, the MPU 16 executes step S4, which determines whether or not the rotating speed of the spindle motor 14 has become equal to the predetermined constant speed equal to 5400 rpm. When the result at step S4 becomes YES, the MPU 16 executes step S5, at which step the MPU 16 turns ON the tracking servo circuit 30. During the tracking servo adjustment, the tracking servo circuit 30 controls the tracking actuator 24 so that the tracking error signal TES is minimized. After the tracking servo adjustment is completed, the MPU 16 sets the disk drive apparatus to the read/write enable state.

A description will now be given, with reference to FIGS. 6A to 10, of a disk drive apparatus according to the second preferred embodiment of the present invention with the PEP bit detection circuit 38 and the inner sensor 40. As has been described previously, the disk drive apparatus has the structure obtained by adding the PEP bit detection circuit 38 and the inner sensor 40 to the structure and operation of the disk drive apparatus according to the aforementioned first preferred embodiment of the present invention, the latter still functioning to perform the light emission adjustment of step S14 in FIG. 6A, and performed at time t2 in FIG. 7. The disk drive apparatus according to the second preferred embodiment then reads data which is used for the light emission adjustment of steps 2 and which is recorded on a PEP zone on the optical disk 10. (see steps S15–S17 in FIG. 6A and time intervals t2 and t3 in FIG. 7). Thus, after step S17 in FIG. 6A, the second embodiment of the present invention does not need the aforementioned reference light emission amounts which are provided respectively for the data write, read and erase operations and which are stored in the MPU 16. The rotating speed of the spindle motor 14 is increased to an intermediate speed over the time interval t1 to t2 (steps S11 to S12) which is less than the predetermined constant speed, and is then maintained at the intermediate speed (t2 to t3). When the spindle motor 14 is rotating at the intermediate speed, PULL-IN of the focus servo control is performed and the "FOCUS SERVO ON" condition is established (S15 and S16 of FIG. 6A and see FIG. 7) and then PEP data recorded on the PEP zone time interval t2 to t3 in FIG. 7 and step S17) is read out. After that, the rotating speed of the spindle motor 14 is increased toward the predetermined constant speed over the time interval t3 to t4 in FIG. 7 and step S19 in FIG. 6B. During this time interval of t3 to t4, the light emission adjustment (FIG. 6B, steps 20) of the laser diode provided in the optical head 22 is carried out on the basis of the readout PEP data.

Figure 8:
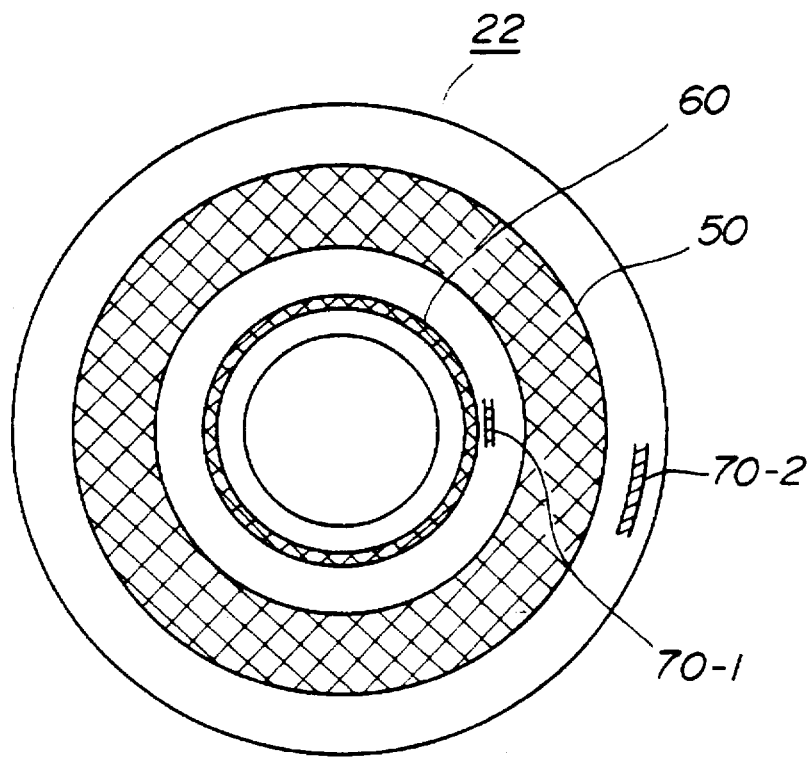
FIG. 8 is a diagram illustrating a storage area of an optical disk which is loaded into the disk drive apparatus according to the second embodiment of the present invention.

Referring to FIG. 8, there is illustrated a storage area of the optical disk 10 which has a PEP zone. The optical disk 10 has a user zone 50 and a PEP zone 60, which is located in an inner portion inside the user zone 50. A SFP zone 70-1 is provided between the user zone 50 and the PEP zone 60, and another SFP zone 70-2 is provided outside of the user zone 50. When it is impossible to read data from the SFP zone 70-1, data recorded on the SFP zone 70-2 is read out. The PEP zone 60 and the SFP zones 70-1 and 70-2 form control zones and data stored therein are called control data.

When the optical disk 10 is loaded into the disk drive apparatus, the PEP zone 60 is read first, the SFP zone 70-1 is then read (the SFP zone 70-2 is read if it is impossible to read the SFP zone 70-1), and the user zone 50 is finally accessed.

Information necessary to read data from the SFP zones 70-1 and 70-2 and the user zone 50 are recorded on the PEP zone 60. Such information contains the format of the optical disk 10, the modulation type, the number of bytes of user data in one sector, and the maximum value of read power used when the SFP zones 70-1 and 70-2 are read. Information necessary to read and write data on and from the user zone 50 is recorded on the SFP zones 70-1 and 70-2. Such information contains the maximum values of the read power, write power and erase power necessary for the light emission adjustment.

The PEP zone 60 will be read by the MPU 16 at the intermediate speed equal to, for example, 2700 rpm, which is half the predetermined constant speed equal to 5400 rpm. More specifically, phase modulated data is read out from the PEP zone 60 in the state where the spindle motor 14 is rotating at the intermediate speed. For this reason, the PEP zone 60 has a format different from the formats of the SFP zones 70-1 and 70-2, and the user zone 50. Of course, the modulation type of data to be recorded on the PEP zone 60 is different from that of data to be recorded on the user zone 50 or the SFP zones 70-1 or 70-2. From the above-mentioned point of view, the PEP bit detection circuit 38 is provided specifically for reading the PEP zone 60 and analyzes data read out from the PEP zone 60 in a conventional way.

It will be noted that recently a high-drivability motor has been manufactured. Such a high-drivability motor enables the optical disk 10 to rotate at a high speed equal to, for example, 5400 rpm. A conventional MPU does not have an operating speed sufficient to read the PEP data while the optical disk 10 is rotating. Thus, it is necessary to read the PEP data before the optical disk 10 reaches 5400 rpm.

Figure 9:
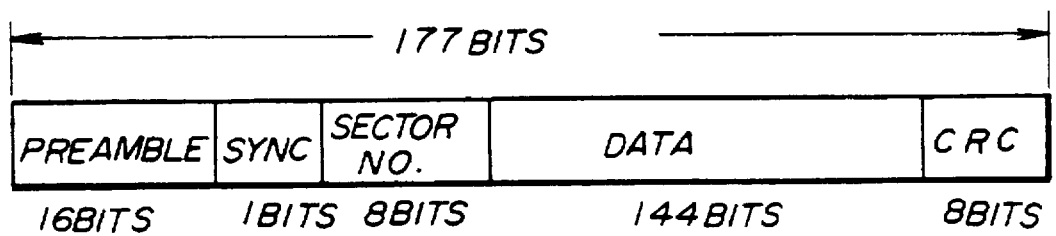
FIG. 9 is a diagram illustrating the format of a sector of a PEP zone on the optical disk shown in FIG. 8.

FIG. 9 illustrates the format of a sector of the PEP zone 60, and FIG. 10 illustrates the format of a sector of the user zone 50. The formats illustrated in FIGS. 9 and 10 are defined by the ISO/IEC DIS 10089, the disclosure of which is hereby incorporated by reference.

The inner sensor 40 is provided for detecting the movement position of the optical head 22 with respect to the PEP zone 60. When the rotating of the spindle motor 14 is started, the MPU 16 controls the voice coil motor 32 so that the optical head 22 moves toward the center of the optical disk 10 until the MPU 16 receives a detection signal output by the inner sensor 40. In response to the detection signal, the MPU 16 stops the movement of the optical head 22. At this position, the optical head 22 reads data recorded on the PEP zone 60. As is well known, the PEP zone 60 has a 500 μm-width ring-shaped track, which is different from a spiral track of the user zone 50. For this reason, there is no need to execute the tracking control during the time data is read out from the PEP zone 60.

Figure 6A:
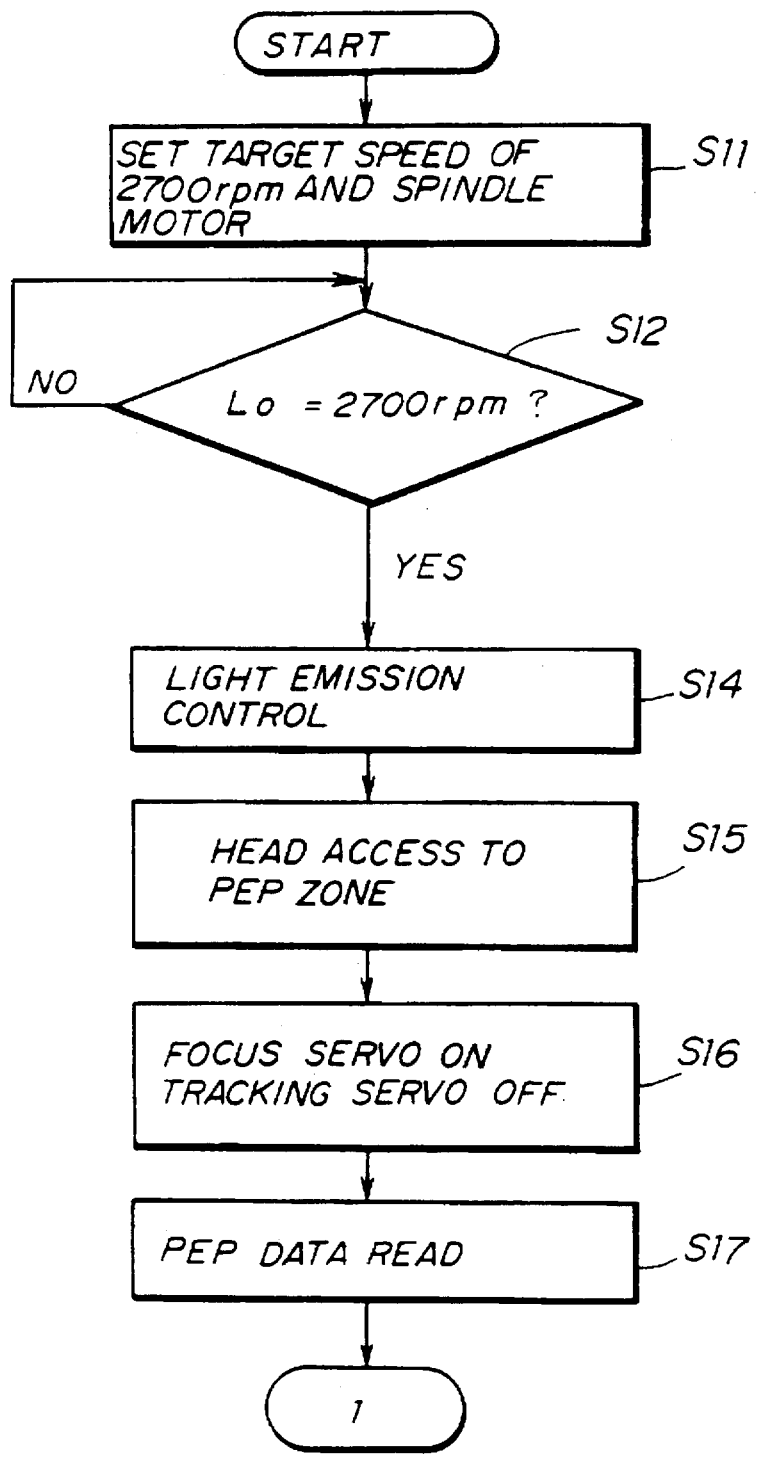
FIG. 6A and FIG. 6B are flowcharts illustrating the operation of the disk drive apparatus according to a second preferred embodiment of the present invention.
Figure 6B:
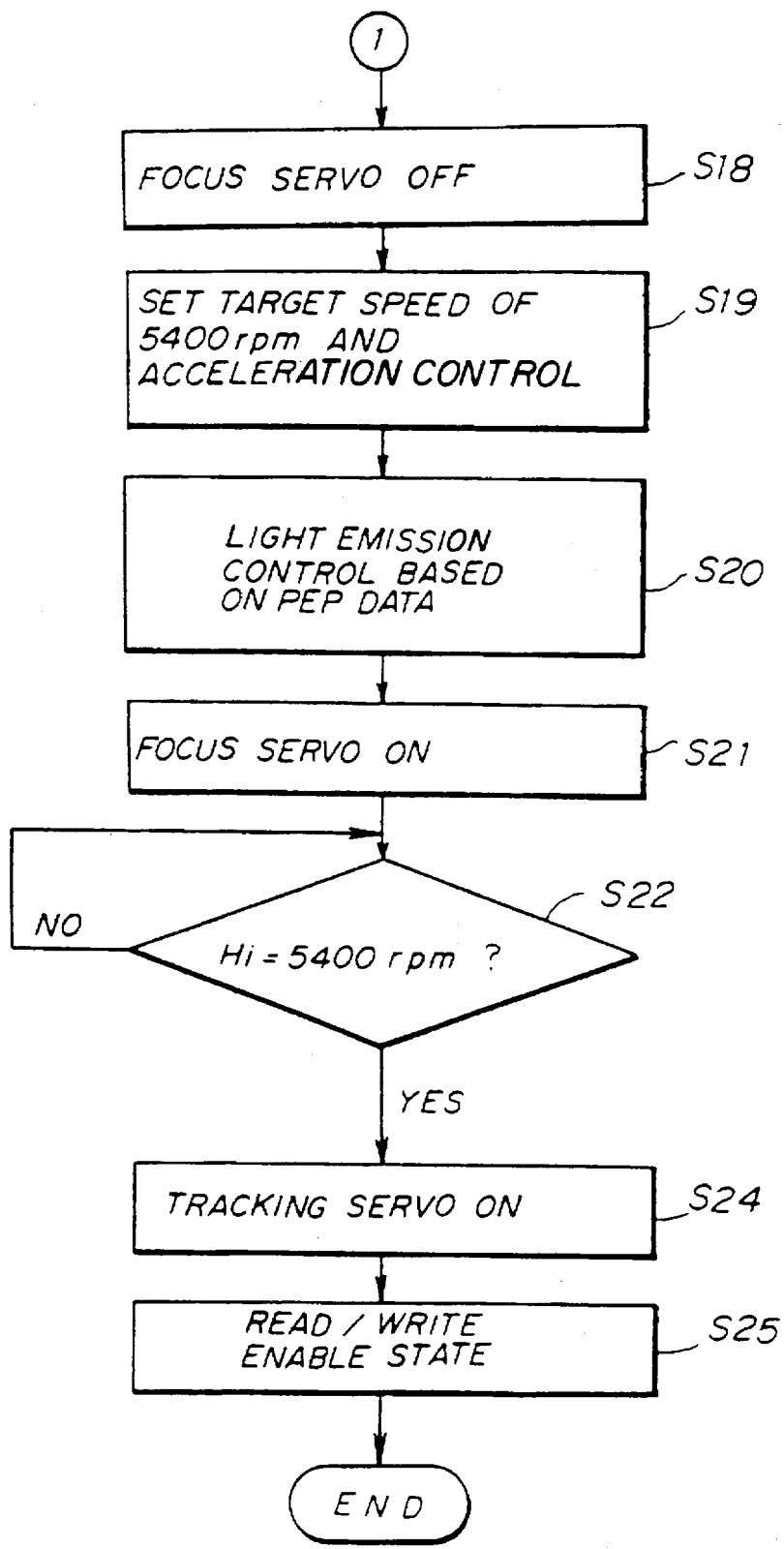
Figure 7:
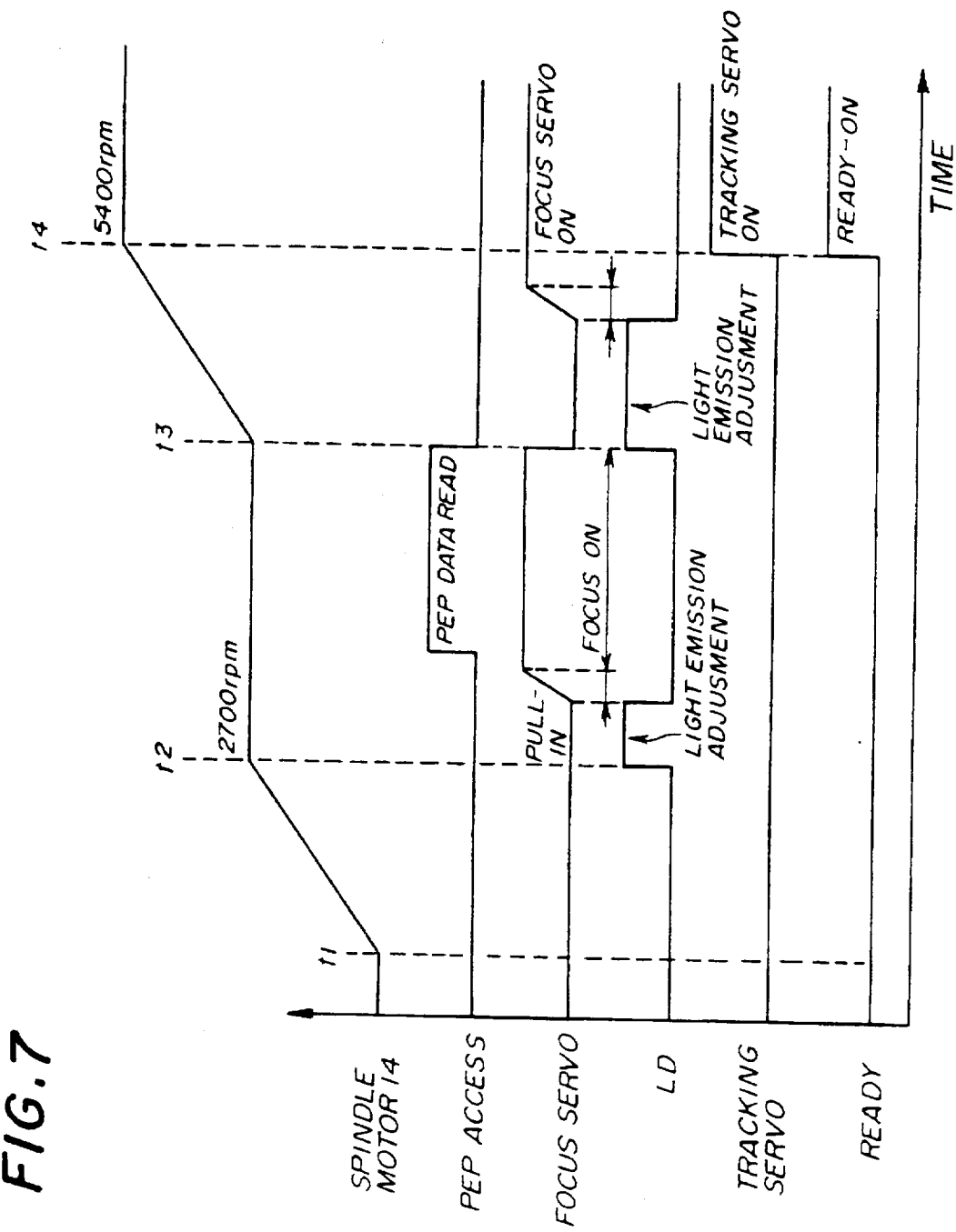
FIG. 7 is a graph illustrating the operation of the disk drive apparatus according to the second embodiment of the present invention.

A description will now be given of the operation of the disk drive apparatus according to the second preferred embodiment of the present invention with reference to FIGS. 6A, 6B and 7. When the loading of the optical disk 10 into the disk drive apparatus is completed, at step S11, the MPU 16 outputs the motor ON signal to the motor control circuit 12, which starts to rotate the spindle motor 14. At this time, the MPU 16 writes data indicative of a lower target speed Lo corresponding to the aforementioned intermediate speed equal to 2700 rpm into the motor control circuit 12. The motor control circuit 12 is formed of, for example, a conventional LSI for controlling a motor, which has a speed control terminal. The data indicative of the lower target speed Lo corresponds to, for example, a low level of the speed control terminal of the LSI. At step S12, the MPU 16 determines whether or not the rotating speed of the spindle motor 14 has become equal to 2700 rpm by comparing the phase of the index signal with the phase of a signal corresponding to the lower target speed Lo. When the result at step S12 becomes YES, the the spindle motor 14 rotates at the lower target speed. At step S14, the MPU 16 controls the light emission control circuit 18 so that the laser diode provided in the optical head 22 emits a low level of power necessary to read the PEP zone 60. During step S14, the aforementioned light emission adjustment for data read is carried out by the light emission control circuit 18. During step S14, the light emission adjustment for adjusting the data write operation is not performed, so that it takes a short time to set the laser diode to the lower power level.

At step S15, the MPU 16 controls the drive circuit 34 and the voice coil motor 32 so that the optical head 22 is accessed to the PEP zone 60. When the detection signal output by the inner sensor 40 is input to the MPU 16, the MPU 16 stops the movement of the optical head 22. Of course, it is possible to carry out step S15 at the same time that step S11 is executed.

At step S16, the focus servo control is turned ON while the tracking control is kept OFF. It will be noted that the focus servo control is started when the light emission adjustment for obtaining data necessary to read PEP data from the PEP zone 60 is completed, as will be seen in FIG. 7. At step S17, data recorded on the PEP zone 60 is read out and sent to the PEP bit detection circuit 38 through the pulse generating circuit 36. The PEP bit detection circuit 38 outputs the PEP data to the MPU 16, which extracts, from the PEP data, information necessary to control the light emission control of the laser diode provided in the optical head 22, such as the maximum emission levels necessary to read the SFP zones 70-1 and 70-2.

At step S18, the MPU 16 instructs the focus servo circuit 30 so that the focus servo control is turned OFF. At step S19, the MPU 16 executes an acceleration control in which the MPU 16 switches the control signal terminal of the motor control circuit 12 from the low level to a high level. Thereby, the rotating speed of the spindle motor 14 increases toward an upper target speed Hi corresponding to the aforementioned predetermined constant speed equal to 5400 rpm.

At step S20 subsequent to step S19, the light emission control circuit 18 executes the light emission adjustment for the data read operation on the basis of the PEP data. The optimum power of light needed for the data read operation is determined by the light emission control circuit 18. When the light emission control by circuit 18 at step 20 is completed PULL-IN of, the focus servo control is started, as shown following t3 in FIG. 7. When PULL-IN of the focus servo control is completed and settled, the focus servo control becomes ON at step S21. At step S22, the MPU 16 determines whether or not Hi=5400 rpm. When the result at step S22 becomes YES, the spindle motor 14 is controlled so as to rotate at the speed of 5400 rpm. At step S24 and prior to time t4 in FIG. 7, the MPU 16 turns ON the tracking servo control, so that the disk drive apparatus is set to the read/write enable state at step 25 ("READ-ON" at 4 in FIG. 7).

It takes approximately 4 seconds to obtain the read/write enable state according to the second preferred embodiment of the present invention which is designed to rotate the optical disk 10 at 5400 rpm.

Several variations of the second embodiment of the present invention can be made. In the second embodiment of the present invention, in order to obtain the appropriate read power of light for reading the SFP zones 70-1 and 70-2, the PEP zone 60 is read while the spindle motor 14 is rotating at 2700 rpm. Alternatively, it is possible to read the SFP zones 70-1 and 70-2 while the spindle motor 14 is rotating at 2700 rpm, respectively adjust read power, write power and erase power of the laser diode on the basis of the information read out from the SFP zones 70-1 and 70-2 and then increase the rotating speed of the spindle motor 14 up to 5400 rpm.

The adjustments before the rotating speed of the optical disk 10 reaches 5400 rpm are not limited to the light emission adjustment control and the focusing adjustment. It is possible to carry out an adjustment which does not need the predetermined constant speed (upper target speed) during the adjustment procedure. For example, it is possible to adjust the voice coil motor 32 before the rotating speed of the optical disk 10 becomes equal to the predetermined constant speed. In this case, a test seeking to obtain offset information and acceleration information is carried out. After the rotating speed of the optical disk 10 becomes equal to the predetermined constant speed, the voice coil motor 32 is controlled on the basis of the obtained offset information and the acceleration information. It is necessary to prevent the above test seeking from being carried out at the same time as the PEP data is read. The intermediate and predetermined constant speeds are not limited to 2700 rpm and 5400 rpm, respectively.

The present invention is not limited to the specifically disclosed embodiments, and variations and modifications may be made without departing from the scope of the present invention.

What is claimed is:

1. A method of disk drive control, said method comprising the steps of:
   (a) accelerating a recording medium, of a disk shape and positioned adjacent to an optical head for being driven in rotation in relation thereto, until a rotating speed of the recording medium reaches a predetermined constant rotating speed at which user data on the recording medium can be read therefrom by the optical head, said step (a) comprising the substeps of:
      (a1) accelerating the recording medium adjacent to the optical head until the rotating speed of the recording medium reaches an intermediate rotating speed, less than the predetermined constant rotating speed;

(a2) maintaining the recording medium at the intermediate speed until a step (c) is complete; and (a3) accelerating the recording medium from the intermediate rotating speed to the predetermined constant rotating speed;

(b) reading control information from a PEP zone of the recording medium after the recording medium has accelerated to the intermediate rotating speed in step (a1), the control information including information for adjusting an amount of light to be omitted from the optical head to a predetermined light level;

(c) adjusting an amount of light emitted from the optical head onto the recording medium in accordance with the control information read from the PEP zone in step (b) and so that the amount of light emitted becomes equal to the predetermined light level before the rotating speed of the recording medium reaches the predetermined constant rotating speed in said step (a3);

(d) focusing the optical head in accordance with performing focus servo pull-in control so that an appropriate spot of light is formed on the recording medium after said step (b) and before the rotating speed of the recording medium reaches the predetermined constant rotating speed in said step (a3); and (e) performing read/write operations after said step (d).

2. An optical disk drive including a disk medium having a user area storing user data and a control area storing control information including a predetermined light level necessary to read the user data, a recorded format of the control information being different from a recorded format of the user data, said optical disk drive comprising:

a spindle motor selectively rotating the disk medium;

an optical head selectively moveable along a radial direction and a normal direction relatively to the disk medium, said optical head reading out the user data from the user area and the control information from the control area of the disk medium, the control information being used to adjust an amount of light to be emitted from said optical head; and a controller, after starting rotation of the disk medium, controlling said spindle motor and said optical head in accordance with the control steps of:

(a) accelerating the disk medium until a rotating speed of the disk medium reaches an intermediate rotating speed at which control information in the control area on the disk medium is readable and which is less than a predetermined constant rotating speed;

(b) reading the control information stored in the control area while the rotating speed of the disk medium is maintained at the intermediate rotating speed at which the control information in the control area on the disk medium is readable;

(c) accelerating the rotating speed of the disk medium from the intermediate rotating speed to the predetermined constant rotating speed;

(d) adjusting the amount of light emitted from the optical head onto the recording medium in accordance with the control information read from the control area during step (b) and such that the amount of light emitted becomes equal to and is maintained at the predetermined light level, during the accelerating step (c) and before the disk medium accelerates to the predetermined constant rotating speed; and (e) performing read operations after completion of step (d).

3. An optical disk drive according to claim 2, wherein the control steps of said controller further comprise:

(f) performing focusing servo adjustment of the optical head so that an appropriate spot of light is formed on the recording medium after said step (d) and before said step (e).

4. An optical disk drive according to claim 2, wherein the control steps of said controller further comprises:

(g) performing tracking servo adjustment of a position of the optical head relative to the disk medium after said step (d) and before said step (e).

5. A method of disk drive control for operating on a recording medium of a disk shape, said method comprising the steps of:

(a) accelerating the recording medium from a rest condition, comprising the substeps of:
(a1) accelerating the recording medium until the rotating speed of the recording medium reaches an intermediate rotating speed less than a specified constant rotating speed,
(a2) maintaining the recording medium at the intermediate rotating speed until step (b) is complete, and
(a3) accelerating the recording medium to continuously increase the rotating speed from the intermediate rotating speed to the specified constant rotating speed;

(b) reading control data recorded on a control data zone in the recording medium during said step (a2), the control data including data specifying an emission level of the light beam;

(c) adjusting the emission level of the light beam in accordance with the control data read in said step (b) during said step (a3);

(d) in said step (a3), focusing the light beam having the adjusted emission level so that an appropriate spot of light is formed on the recording medium for performing step (e); and (e) after said step (d) and when the recording medium is at the specified constant rotating speed, defining an ON condition for performing operations on the recording medium with respect to user data.

6. A method of disk drive control as recited in claim 5, further comprising performing step (c) so that the adjusted emission level becomes constant before the rotating speed of the recording medium reaches the specified constant rotating speed during said step (a3).

7. A method of disk drive control as recited in claim 5, further comprising performing step (d) before the rotating speed of the recording medium reaches the specified constant rotating speed in said step (a3).

8. A method of disk drive control as recited in claim 5, wherein the operations performed on the recording medium with respect to user data comprises selective read/write and erase operations.

9. A method of disk drive control as recited in claim 5, wherein the adjusted emission level of the light beam and the focusing of the light beam produces an appropriate spot of light on the recording medium for operating thereon at the specified constant rotating speed in accordance with any of writing, and thereby recording, data onto the recording medium and reading and erasing recorded data from the recording medium.

10. A method of disk drive control as recited in claim 5, wherein:

step (b) comprises reading PEP control data recorded in a corresponding PEP zone in the recording medium; and the recording medium further has SFP control data stored thereon in a corresponding SFP zone, the PEP data specifying an emission level for reading the SFP control data and the SFP control data specifying the light emission level of the light beam for performing the operations on the recording medium with respect to user data of step (e).

11. A method of disk drive control as recited in claim 10, wherein the SFP control data is read during step (a2).

12. A method of disk drive control as recited in claim 10, wherein the SFP control data is read at the specified constant rotating speed of the recording medium.

13. A method for controlling an optical disk drive including a disk medium having a user area storing user data and a control area storing control data necessary to read the user data and including data for setting a light emission level of a light beam used for operating on the recording medium with respect to the user data, a recorded format of the control data being different from a recorded format of the user data, said method comprising the steps of:

(a) accelerating a disk medium until a rotating speed of the disk medium reaches a specified constant rotating speed specified for said operating on the recording medium with respect to user data;

(b) reading the control data stored in the control area while the rotating speed of the disk medium is maintained at an intermediate rotating speed which is lower than the specified constant rotating speed and at which the control data at the control area on the disk medium is readable; and (c) initializing the optical disk drive, the initializing comprising setting the emission level of the light beam in accordance with the read control data and as required for said operating on the recording medium with respect to the user data at said specified constant rotating speed, while accelerating the disk medium to continuously increase the rotating speed of the disk medium from the intermediate rotating speed to the specified constant rotating speed.

14. A method as recited in claim 13, further comprising performing step (c) while constantly accelerating the disk medium to continuously increase the rotating speed of the disk medium from the intermediate rotating speed to the predetermined rotating speed.

15. A method as recited in claim 13, wherein the initializing step further comprises performing a focusing servo adjustment of the light beam so as to form an appropriate spot of light on the optical recording medium as required for said operating on the recording medium with respect to the user data at said specified constant rotating speed.

16. A method as recited in claim 15, wherein the initializing step further comprises performing focus servo adjustment of the light beam so that the appropriate spot of light is located centrally on a desired track of the recording medium as required for said operating on the recording medium with respect to the user data at said specified constant rotating speed.

17. An optical disk drive for a disk medium having a user disk area storing user data and a control data area storing control data necessary to read the user data, a recorded format of the control data being different from a recorded format of the user data, said optical disk drive comprising:

a spindle motor rotating the disk medium;

an optical head moving along a radial direction and a normal direction relatively to the disk medium and emitting a light beam for reading the user data from the user data area and the control data from the control data area of the disk medium, the control data specifying an emission level of the light beam emitted from said optical head; and a controller controlling said optical head and said spindle motor to rotate the disk medium in accordance with:

(a) accelerating the disk medium from a rest condition of non-rotation and until a rotating speed of the disk medium reaches a first rotating speed which is lower than a second rotating speed at which the user data on the disk medium can be read out, (b) reading the control data stored in the control area while the rotating speed of the disk medium is maintained at the first rotating speed, (c) accelerating to continuously increase the rotating speed of the disk medium from the first rotating speed to the second rotating speed, (d) adjusting the emission level of the light beam in accordance with the control data during said accelerating step (c), and (e) performing read operatings after said step (d).

18. A discharge control method as recited in claim 17, further comprising, in step (c), constantly accelerating the rotating speed of the disk medium to continuously increase the rotating speed from the first rotating speed to the second rotating speed.

19. A discharge control method as recited in claim 17, further comprising performing step (d) so that the adjusted light beam emission level-becomes constant before completion of said accelerating step (c).

20. A disk drive control method for disk shaped recording media of plural different types, each recording medium being driven in rotation and scanned by a light beam for operating thereon as to user data in accordance with selectively writing, and thereby recording, user data thereon and for reading and erasing user data previously recorded thereon, the plural different types of recording media respectively having plural and different, initial specified light emission levels of the light beam required for reading control data recorded thereon and the control data defining a further specified light emission level of the light beam required in relation to said operating on the recording medium as to user data, the method comprising:

(a) controlling the rotating speed of a selected recording medium in accordance with:

(a1) in a first time interval, accelerating the selected recording medium from a condition of non-rotation to a first fixed rotating speed at which first control data recorded thereon is readable from the recording medium by the light beam, (a2) during a successive, second time interval, maintaining the selected recording medium at the first fixed rotating speed and reading the first control data therefrom by the light beam, (a3) during a successive, third time interval, accelerating the selected recording medium from the first fixed rotating speed to a second fixed rotating speed of rotation, higher than the first fixed rotating speed, specified for said operating on the recording medium as to user data, and (a4) during a successive, fourth time interval, maintaining the selected recording medium at the second fixed rotating speed, specified for said operating on the recording medium as to user data;

(b) prior to reading the first control data from the selected recording medium during step (a2), adjusting the light emission level of the light beam to the initial light emission level specified for the respective recording media type of the selected recording medium; and (c) prior to conclusion of the third time interval and based on the first control data read from the recording medium, adjusting the light emission level of the light beam and focusing the light beam on the recording medium for said operating on the recording medium as to user data.

21. The method as recited in claim 20, wherein the control data and the user data are recorded in respective, different formats and in respective, different locations on each recording medium.

22. The method as recited in claim 20, wherein the control data on the recording medium further comprises first and second control data, the first control data defining a first specific light emission level for reading the second control data and the second control data defining a second specific light emission level of the light beam for said operating on the selected recording medium as to user data and wherein step (c) further comprises:

adjusting the light emission level of the light beam to the first specific light emission level as defined by the read, first control data for reading the second control data and further adjusting the light beam to the second specific light emission level as defined by the read, second control data.

23. The method as recited in claim 22, wherein the first control data comprises PEP data and the second control data comprises SFP data recorded in respective and different PEP and SFP data zones on the recording medium.

24. A method as recited in claim 22, further comprising reading the second control data during the second time interval, after reading the first control data.

25. A method as recited in claim 22, further comprising reading the second control data at the second fixed rotating speed and during the third time interval.

26. A method as recited in claim 22, further comprising adjusting the radial position of the light beam relatively to the recording medium at a time, selected within one of the first and second time intervals, prior to reading the first control data.

27. A method as recited in claim 22, further comprising, in succession and prior to reading the first control data from the recording medium during step (a2):

performing focus pull-in for focusing the light beam on the recording medium; and initiating focus servo control of the pulled-in light beam.

28. A method as recited in claim 27, further comprising performing focus pull-in and initiating focus servo control after the recording medium is rotating at the first, fixed rotating speed.

29. A method as recited in claim 28, further comprising adjusting the light emission level of the light beam, based on the first control data and performing pull-in of the focus servo and turning ON the focus servo prior to the recording medium reaching the second fixed rotating speed in step (a3).

30. A method as recited in claim 29, further comprising, in a fourth time interval and prior to operating on the recording medium as to user data, turning a tracking servo ON and initiating a ready-ON condition for enabling operating on the recording medium as to user data.

* * * * *

UNITED STATES PATENT AND TRADEMARK OFFICE
CERTIFICATE OF CORRECTION

PATENT NO. : 5,724,328
DATED : Mar. 3, 1998
INVENTOR(S) : YANAGI

It is certified that error appears in the above-identified patent and that said Letters Patent is hereby corrected as shown below:

TITLE PAGE:
[62] Related U.S. Application Data, line 2, change "Sep. 18, 1993" to --Sep. 3, 1993--.

Col. 1, line 12, delete "," (first occurrence).

Col. 5, line 9, change "old" to --out--.

Col. 8, line 13, change "at 4" to --at t4--.

Col. 12, line 19 (Claim 17, last line), change "operatings" to --operations--.

Signed and Sealed this

Twenty-third Day of June, 1998

Attest:

BRUCE LEHMAN

Attesting Officer     Commissioner of Patents and Trademarks